Jan. 8, 1935.  C. M. TUTTLE ET AL  1,987,036
PHOTOGRAPHIC PRINTING APPARATUS
Filed Nov. 4, 1933
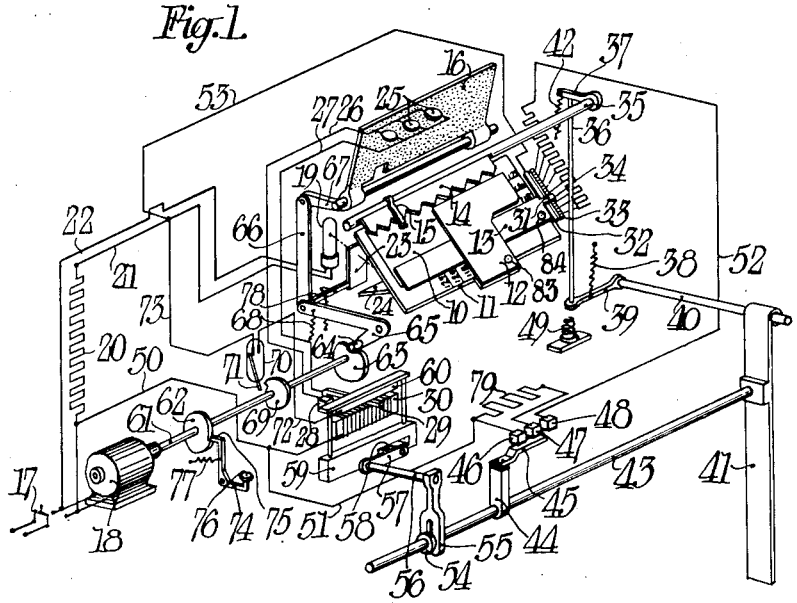
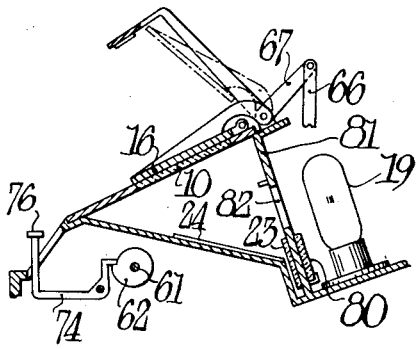
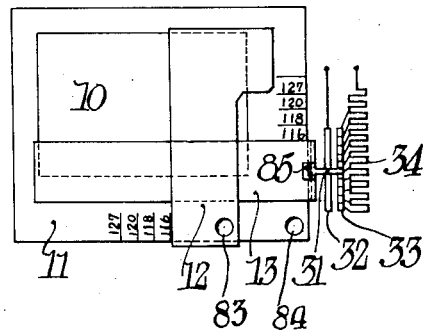
Inventors:
Clifton M. Tuttle & D'Arcy A. Young, Jr.

Patented Jan. 8, 1935

1,987,036

UNITED STATES PATENT OFFICE 1,987,036

PHOTOGRAPHIC PRINTING APPARATUS

Clifton M. Tuttle and D'Arcy A. Young, Jr., Rochester, N. Y., assignors to Eastman Kodak Company, Rochester, N. Y., a corporation of New York Application November 4, 1933, Serial No. 696,673

8 Claims. (Cl. 95—73)

Our invention relates to photographic printing apparatus in which the intensity of the printing light is automatically controlled in accordance with the density of the negative being printed and more particularly to apparatus for controlling the measuring system in accordance with the size of the negative and the grade of paper used.

In automatic printers that utilize a radiation sensitive element to measure total negative transmission, the negative size usually varies and it is desirable to regulate some part of the measuring system so that it will operate over its normal range and therefore with a constant sensitivity for any one of a series of predetermined negative sizes. Our present invention provides for such regulation and it may be accomplished by introducing an optical wedge or a series of filters between the lamp and the light-sensitive cell or the intensity of the lamp may be adjusted in accordance with the size of the negative. Each of these arrangements makes it possible for the measuring system to operate over its normal range and at a constant sensitivity for negatives of different size. Another way of regulating the system is to change the effective sensitivity of the measuring system as by introducing a variable amount of resistance into the cell circuit.

In accordance with our invention the negative measuring system is automatically regulated, as above described, by the adjustment of sliding masks to corerspond to the size of the negative to be printed.

Further in accordance with our invention the measuring system is adjusted in accordance with the grade of paper to be used so that the printing exposure will be of the proper value.

Still further in accordance with our invention means are provided for adjusting the measuring system to measure properly the printing characteristics of negatives of unusual subjects such as snow scenes which are usually very dense.

Our invention consists substantially in the construction, combination, location, and relative arrangement of parts, and the novel features which we believe to be characteristic of our invention are set forth with particularity in the appended claims. Our invention itself, however, both as to its organization and method of operation will best be understood by reference to the following description taken in connection with the accompanying drawing in which—

Fig. 1 is a diagrammatic view in perspective of the essential mechanism and circuit organization of an apparatus constructed in accordance with our invention;

Fig. 2 is a side view in section of the illumination system both for measuring and printing; and Fig. 3 is a plan view of the printing panel and its masking members.

Referring to Fig. 1 of the drawing, in which is shown only those parts necessary to a complete understanding of our invention, we have shown our invention as applied to a contact printer having the usual printing panel 10 mounted in a suitable frame 11 which may form the top of the printing box. Metal strips 12 and 13 are slidably mounted along the edges of the frame 11 to form a mask for margining the print on these sides, while the margins on the opposite sides are determined by the limits of the transparent printing panel 10.

The negative is adapted to be held on the panel 10 by a suitable clamp 14 which is operated in a manner hereinafter described. The printing paper may be held in position on the negative by a spring clip 15 and be pressed thereon during printing by a platen 16.

A main switch 17 connects a motor 18 to any suitable source of power and energizes a printing lamp 19 to a predetermined low intensity through a resistance 20 and leads 21 and 22. Light from the lamp 19 passes through a non-actinic glass filter 23 and is reflected by a mirror 24 onto the printing panel 10 to furnish sufficient illumination for the operator.

The system for measuring the transmission of a negative placed on the panel 10 comprises a plurality of light-sensitive elements 25 which may preferably be photo-voltaic cells of the dry type, connected in multiple through leads 26 and 27 to a meter coil 28 carrying a pointer 29 which is adapted to adjust a resistance winding 30 as fully described by C. M. Tuttle, one of the present inventors, in his co-pending U. S. application, Serial No. 557,260, filed August 15, 1931. For adjusting the measuring system in accordance with the size of the negative, the masking member 13 is provided at one end with a projecting lug 31 which spans and has sliding engagement with a bar contact 32 and a series of individual contacts 33 connected to different points on a resistance 34 whereby adjustment of the mask 13 correspondingly adjusts the resistance 34. The resistance 34 as adjusted influences the measuring system as is next to be described.

If a negative of the size known commercially as 118 is to be printed, the operator adjusts the masks 12 and 13 to the positions shown in Fig.

1 which automatically sets the resistance 34 to the proper value. The negative clamping member 14 is mounted in a slot in a bar 35 and is held in clamping position by the upward thrust of a rod 36 bearing against the under side of an arm 37 secured to the bar 35. This upward thrust is imparted to the rod 36 by a tension spring 38 fastened to a crank 39 secured at one end to a shaft 40 and supporting at its other end the rod 36. To overcome the tension of the spring 38, the shaft 40 is provided with a lever 41 which may be positioned to be moved to the right by the knee of the operator. Such movement of the lever 41 rotates the shaft 40 and the crank 39 to lower the rod 36 and allow a spring 42 secured to the arm 37 to rotate the bar 35 and thereby elevate the clamping member 14 to permit insertion of the edge of the negative thereunder after which pressure on the lever 41 is released and the spring 38 functions to return the member 14 to clamping position on the negative.

A horizontal rod 43 secured at one end to the lever 41 is provided with an arm 44 which is provided at its outer end with a contact bar 45 adapted for sliding engagement with three individual contacts 46, 47, and 48 and is of sufficient length to engage simultaneously all three of the individual contacts 46, 47, and 48. When the lever 41 is in released position, as shown, the contact bar 45 engages only the contacts 46 and 47 and when the lever 41 is moved to the right until the crank 39 rests upon a coiled spring 49, the contact bar 45 engages all three contacts 46, 47, and 48. The spanning of the three contacts 46, 47, and 48 completes a circuit through the resistance 34 in shunt relation to the resistance 20 in the lamp circuit. This circuit may be traced from the lower end of the resistance 20 through leads 50 and 51, the contacts 46, 45, and 48, lead 52, the masking resistance 34, contact 31 and bar 32 and lead 53 to lead 21 which is connected to the upper side of the lamp circuit resistance 20.

Rod 43 is also provided with a nut 54 which abuts against a bifurcated member 55 mounted on a shaft 56 provided at one end with a crank 57 carrying at its outer end a pin 58 which extends through a slot in a block 59 which is adapted to raise and lower a presser bar 60 for depressing the meter pointer 29 into engagement with the resistance 30. Movement of the rod 43 to the right rotates the shaft 56 thereby raising the block 59 and the presser bar 60 supported thereon. This movement releases the meter pointer 29, permitting it to assume a position corresponding to the response of the cells 25 to light transmitted by the negative positioned on the panel 10. After such measuring the lever 41 is released and under the tension of the spring 38 is returned to the position shown in Fig. 1, in which position the clamp 14 engages the negative to hold it in position, the shunt circuit through the resistance 34 is opened at the contact 48, and the block 59 pulls the presser bar 60 to depress the meter pointer 29 into electrical contact with the resistance 30 whereby the magnitude of the resistance 30 corresponds to the transmission of the negative on the printing panel.

The paper to be printed is inserted beneath the spring clip 15 which holds it in position over the negative and will be given a proper exposure if the resistance 30 as adjusted is inserted in the circuit of the lamp 19 which is then used to supply the printing exposure for a predetermined interval.

The motor 18 rotates continuously and is adapted to be connected to a control shaft 61 for one complete revolution by means of a one-revolution clutch 62 which may be of the ball-wedging type fully disclosed in our U. S. Patent No. 1,933,831, issued November 7, 1933. The control shaft 61 is provided with a heart-shaped cam 63 which cooperates with a cam follower 64 to lower the platen 16 through a linkage consisting of a bell crank 65 and a link 66 connected to an arm 67 secured to the platen 16. The shape of the cam 63 is such that the first part of the single revolution of the shaft 61 lowers the platen 16 to press the paper firmly against the negative positioned on the printing panel 10 and holds it there until near the end of this single revolution at which time a spring 68 secured to one arm of the bell crank 65 is permitted to return the platen 16 to raised position.

The control shaft 61 also carries a switch operating cam 69 having a sector of its rim removed for the purpose now to be described. A suitable switch 70 which may be of the well-known vacuum type is positioned with its operating member 71 in the path of the cam 69 so that upon rotation of this cam the portion not cut away engages the operating member 71 to move the switch 70 to circuit closing position for a part of the single revolution of the shaft 61 as predetermined by the shape of the cam 69. The switch 70 upon closing completes a circuit through the resistance 30 to insert it in shunt relation to the lamp circuit resistance 20. This circuit may be traced from one side of the resistance 20 through the lead 50, the resistance 30, meter pointer 29, the presser bar 60, the lead 72, the switch 70, and the leads 73 and 21 to the other side of the resistance 20. It will be seen that the completion of this circuit will energize the lamp 19 to an intensity corresponding to the value of the resistance 30 as determined by the meter pointer 29.

A clutch operating member comprising a bell crank 74 provided with a hook 75 and a finger button 76 is adapted normally to hold the clutch 62 out of engagement. Depressing the button 76 releases the hook 75 and permits the clutch 62 to connect the motor 18 to the shaft 61 and after one complete revolution thereof, the hook 75 which is biased by a spring 77 disengages the clutch 62 and stops the shaft 61 until the button 76 is again depressed. During this single revolution of the shaft 61, the cam 63 operates to lower the platen to printing position for a predetermined part of the single revolution and the switch operating cam 69 closes the switch 70 for a predetermined part if the single revolution to energize the lamp 19 to the proper intensity for printing as determined by the adjustment of the resistance 30. When the platen is lowered, the long arm of the bell crank 65 rotates a pivoted member 78 to move the non-actinic filter 23 out of the path of the light between the lamp 19 and the printing panel 10 whereby a printing exposure is obtained having an intensity determined by the resistance 30 and a time interval determined by the shape of the cam 69.

It will be seen from the above description that the apparatus of our invention provides a printer in which adjustment of the masking members 70 to the size of the negative to be printed and the movement of the lever 41 for clamping the negative in position automatically adjusts the resistance 30 to a value corresponding to the actual transmission of the negative to be printed regardless of the size of this negative and that upon momentarily depressing the operating button 76 the adjusted resistance 30 is connected in circuit with the lamp 19 and a printing exposure given for a predetermined time interval.

If in the opinion of the operator the subject matter recorded on the negative requires that it be printed on a hard paper and therefore requires more exposure than if printed on ordinary paper, the operator moves the lever 41 to its extreme position against the compression of the coiled spring 49 and thereby moves the sliding contact 45 out of engagement with the individual contact 46. This extreme movement inserts the resistance 79 in series with the masking resistance 44 for the measuring operation and accordingly the resistance 30 is adjusted to a lower value than it would have been had the resistance 79 not been included in the measuring system. Since the resistance 30 has a lower value, the lamp 19 will be energized to a higher intensity for the printing operation and the hard paper will receive the proper exposure.

In printing very dense negatives depicting unusual subjects, such as snow scenes, it has been found that the measuring system as above described will, in general, function to over-expose the details of the picture in an attempt to give the proper exposure for the negative as a whole. In order to properly print such negatives we have provided, as shown in Fig. 2, a 50% filter 80 which may be moved in any suitable manner, as by hand, into position in front of the lamp 19 during the printing exposure, that is, the negative is measured as any other negative and the resistance 30 adjusted accordingly, but prior to the time the printing cycle is started by depressing the button 76 the filter 80 is moved into the light path so that during printing it effectively decreases the exposure to an extent which has been found to be sufficient to properly expose details carried by the negative.

One suitable arrangement of the illuminating system is shown in Fig. 2 as comprising a housing 81 which carries the printing panel 10 and the mirror 24. The lamp 19 which, of course, will be suitably enclosed in a light-tight casing is positioned behind the housing 81 provided with an aperture 82 through which light is adapted to pass and fall upon the mirror 24 which reflects it to the printing panel 10. As previously described, the non-actinic filter 23 is positioned over the aperture 82 during the measuring operation and is removed therefrom to the position shown in Fig. 2 during the time the platen 16 is in printing position. The 50% filter 80 is located behind the housing 81 and is movable in any suitable manner into position over the aperture 82 when it is desired to decrease the exposure below that determined by the measuring system as when printing negatives made from snow scenes and the like.

Fig. 3 is a plan view of the printing panel 10 and its masking members 12 and 13 and shows in greater detail one arrangement which may be used. The frame 11 is provided with indexes for indicating the positions to which the masking members 12 and 13 should be moved to accommodate negatives of different sizes. These indexes are here marked in the numbers by which the different sized films are known commercially. The masks 12 and 13 may be provided with knobs 83 and 84, respectively, to make it easier to adjust the masks 12 and 13. The projecting lug 31 which spans the contact bar 32 and the contacts 33 is secured to the mask 13 in any suitable manner as by screws 85.

The operation of the apparatus above described is as follows: The masks 12 and 13 are adjusted to accommodate the negative to be printed which is then positioned on the printing panel 10 with one edge under the clamping member 14 which has been raised by moving the lever 41 to the right. During this time the resistance 34, as adjusted by the mask 13, is included in the circuit of the lamp to bring it to the proper intensity for measuring purposes. The light transmitted by the negative causes the meter pointer 29 to be deflected by an amount corresponding to the transmission of the negative and when the lever 41 is released to clamp the negative in position, the meter pointer is pressed in its deflected position against the resistance 30 which is thereby given a value corresponding to correct printing for the negative just measured. To initiate the actual printing cycle the clutch 62 is engaged for one complete revolution of the control shaft, and during this single revolution the platen is lowered and the non-actinic filter removed from the light path and the resistance 30 is inserted in the lamp circuit to energize it to the proper intensity for a predetermined time after which the lamp circuit through the resistance 30 is opened, the platen is raised, and the non-actinic filter returned to the light path. The exposed paper is then removed and a second print may be made with the same exposure or a different negative may be inserted and the operation repeated.

While we have disclosed our invention as incorporated in a specific apparatus, it will be obvious that other embodiments may be employed and other mechanism may be used for carrying out the several operations in accordance with our invention. In the apparatus illustrated only those parts have been shown which are necessary to a full understanding of our invention. The complete supporting structure and the various housings and bearings for the different operating parts have not been shown, since they would unduly complicate the disclosure and description and can readily be provided by anyone skilled in this art since many suitable structures known to the prior art are available.

It is to be understood that our invention is not restricted to the specific embodiment illustrated, since it will be obvious to those skilled in the art that various modifications of our invention will readily suggest themselves without departing from the scope of our invention as set forth in the appended claims.

What we claim as new and desire to secure by Letters Patent of the United States is:

1. In photographic printing apparatus, means for determining the total transmission of a record to be printed, means for governing the transmission determination in accordance with the area of the record, whereby such determination is a fixed function of the transmission of a unit area of the record, means for adjusting a resistance to a value corresponding to such transmission determination, a lamp, switching means for connecting the adjusted resistance in circuit with the lamp, means for initiating and ending an exposure period, and means for operating in time sequence said switching means and the exposure starting and stopping means.

2. In a photographic printing apparatus, the combination of a system for measuring the total transmission of a record to be printed, a printing panel, movable masking members for adjusting the effective size of the printing panel, and means controlled by the movement of at least one of the masking members for adjusting a characteristic of said measuring system.

3. In photographic printing apparatus, a system for measuring in terms of unit area the transmission of a record to be printed including means adjustable in accordance with the size of the record and means controlled by said adjustable means for regulating said measuring system.

4. In photographic printing apparatus having a printing panel, means for holding a photographic record on said panel, means for masking said panel to correspond to the size of the record, a measuring system for determining the printing characteristics of the record on said panel, and means for adjusting the constants of said system in accordance with the position of said masking means.

5. Photographic printing apparatus including a light source and a printing panel, means for supporting an image bearing record on said panel, a light-sensitive element adapted to be activated by light transmitted by said record, means controlled by said element for predetermining a printing exposure, and means adjustable in accordance with the size of said record for regulating the intensity of the light falling on said record.

6. Photographic printing apparatus comprising in combination means for holding a photographic record, a lamp for illuminating the record, an adjustable resistance in circuit with the lamp, a light-sensitive element positioned to receive light transmitted by the record and adapted to predetermine the proper exposure for the record, adjustable means for restricting the light falling on said element to that actually transmitted by said record, and means controlled by the adjustment of said light restricting means for adjusting the resistance in circuit with said lamp.

7. Photographic printing apparatus in which the printing exposure is predetermined in accordance with the total transmission of the record to be printed by means of a system including a measuring light and a light-sensitive element, means for adjusting the apparatus to accommodate records differing in size and means for varying the intensity of the measuring light in accordance with the position of said adjusting means.

8. In apparatus of the character described, the combination of a system for measuring the total light transmission of photographic records of different sizes and means for regulating said measuring system in accordance with the size of the record being measured, whereby the measuring system always operates over the same range.

CLIFTON M. TUTTLE.
D'ARCY A. YOUNG, Jr.